United States Patent
Shaw et al.

(10) Patent No.: US 7,308,641 B2
(45) Date of Patent: Dec. 11, 2007

(54) NOTEBOOK LAYOUT VIEW

(75) Inventors: Han-yi Shaw, Redmond, WA (US); Nicolas J. G. Trescases, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 341 days.

(21) Appl. No.: 10/903,094

(22) Filed: Jul. 30, 2004

(65) Prior Publication Data

US 2006/0026495 A1 Feb. 2, 2006

(51) Int. Cl.
*G06N 3/00* (2006.01)
(52) U.S. Cl. ...................... 715/500; 715/513
(58) Field of Classification Search ............... 715/513, 715/517, 523, 530, 500
See application file for complete search history.

(56) References Cited

U.S. PATENT DOCUMENTS 6,687,876 B1 * 2/2004 Schilit et al. ............... 715/512

2004/0135805 A1 * 7/2004 Gottsacker et al. ......... 345/751

OTHER PUBLICATIONS

"Microsoft(r) Word for Windows(tm) User's Guide," 1991, Microsoft Corporation, pp. 675-679.*

* cited by examiner

*Primary Examiner*—Stephen Hong
*Assistant Examiner*—Kyle R Stork
(74) *Attorney, Agent, or Firm*—Workman Nydegger (57) ABSTRACT

A method and system for seamlessly integrating typical word processing functionality with note taking. A new view called a notebook layout view is added to the already-existing views of a word processor. Data needed for the notebook layout view is stored in data structures that already exist for the word processor. When creating a document in the notebook layout view, icons and menus are displayed that relate to note-taking. In addition, the notebook layout view is further optimized to allow input in a manner intuitive to paper notebook users.

27 Claims, 6 Drawing Sheets

NOTEBOOK LAYOUT VIEW

FIELD OF THE INVENTION

The invention relates generally to computers, and more particularly to word processing applications.

BACKGROUND

Computers have been used for word processing for many years. Word processors are computer programs that are designed for writing documents such as letters, reports, research papers, and the like. Because word processors have been designed in view of the specific needs of these kinds of documents, word processors have not been particularly suited for note taking, which has its own special style and format.

Some software applications have been developed with note taking specifically in mind. Such applications, however, do not perform well or at all when faced with tasks typically found in the domain of a word processor. Furthermore, transferring information from such applications to a word processor or other application has been problematic and tedious. What is needed is a method and system that seamlessly integrates typical word processing functionality with note taking. Ideally, such a method and system would allow easy viewing of the information in a typical word processing format to a note taking format and vice versa.

SUMMARY

Briefly, the present invention provides a method and system for seamlessly integrating typical word processing functionality with note taking. A new view called a notebook layout view is added to the already-existing views of a word processor. Data needed for the notebook layout view is stored in data structures that already exist for the word processor. When creating a document in the notebook layout view, icons and menus that relate to note-taking are exposed. In addition, the graphical user interface of the notebook layout view is further optimized to allow input in a manner intuitive to paper notebook users.

In one aspect of the invention, data properties that are created for the notebook layout view are stored in data structures that already exist in the word processor. Some of these data structures directly correspond to items that are viewable in other views of the word processor. Sometimes these data structures cause a similar or identical appearance when switching between views. Other times, the data structures cause one view in the notebook layout view and another view in a non-notebook layout view. Other data properties of the notebook layout view, while maintained while in the other views of the word processor, do not affect the appearance of text in the other views. They are stored so that when switching back to the notebook layout view they may be used in properly displaying text and items in the notebook layout view.

In another aspect of the invention, the method of storing the notebook view data properties in data structures that already exist in a word processor as described herein provides great compatibility with previous and cross-platform versions of the word processor. Not only can these other versions view and edit documents created in the notebook layout view, but after viewing and editing the documents in these other views, the documents can be switched back to notebook layout view while retaining most or all of the formatting originally created while in the notebook layout view.

Other advantages will become apparent from the following detailed description when taken in conjunction with the drawings, in which:

DETAILED DESCRIPTION

Exemplary Operating Environment

Figure 1:
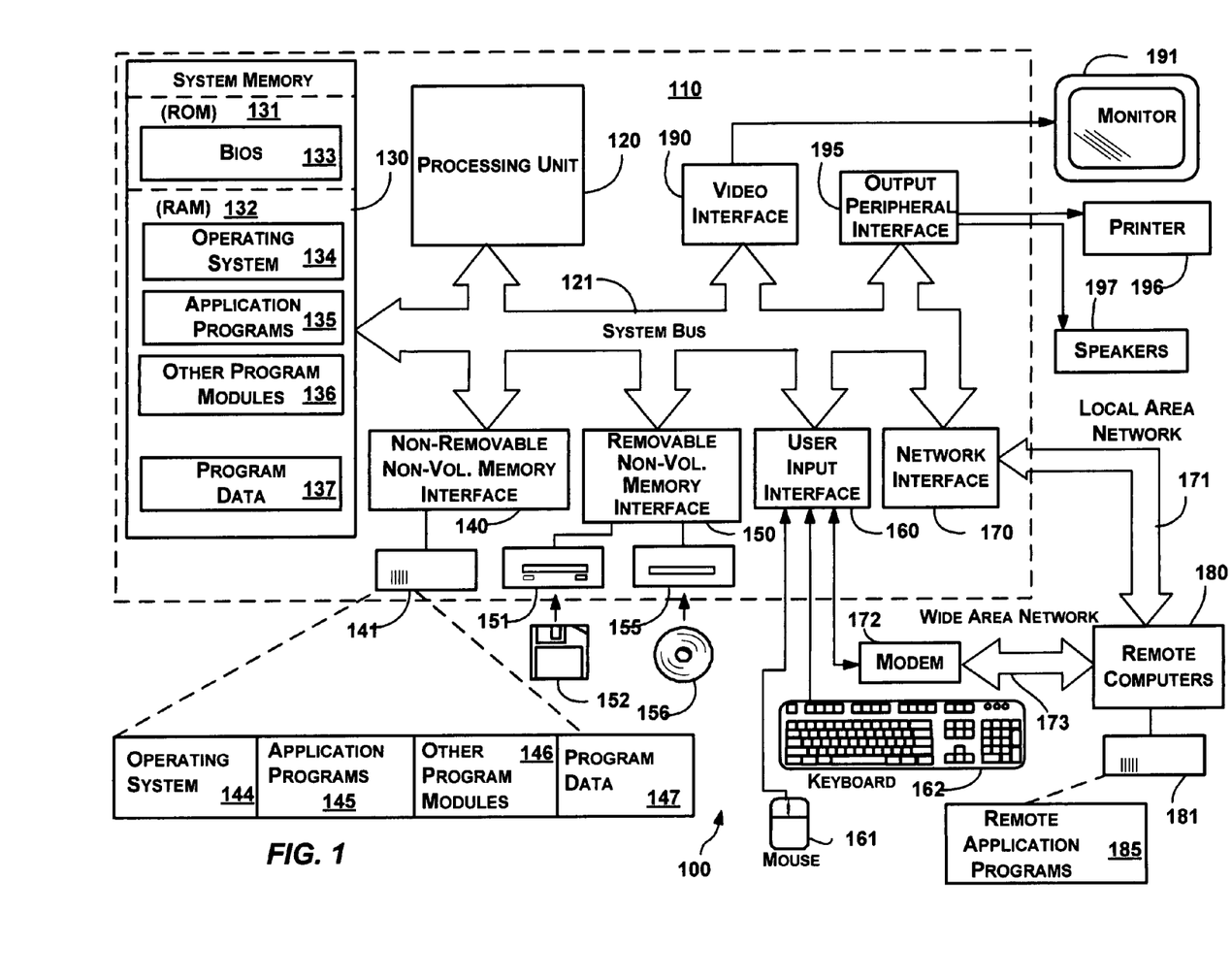
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Note Taking Word Processor

Figure 2:
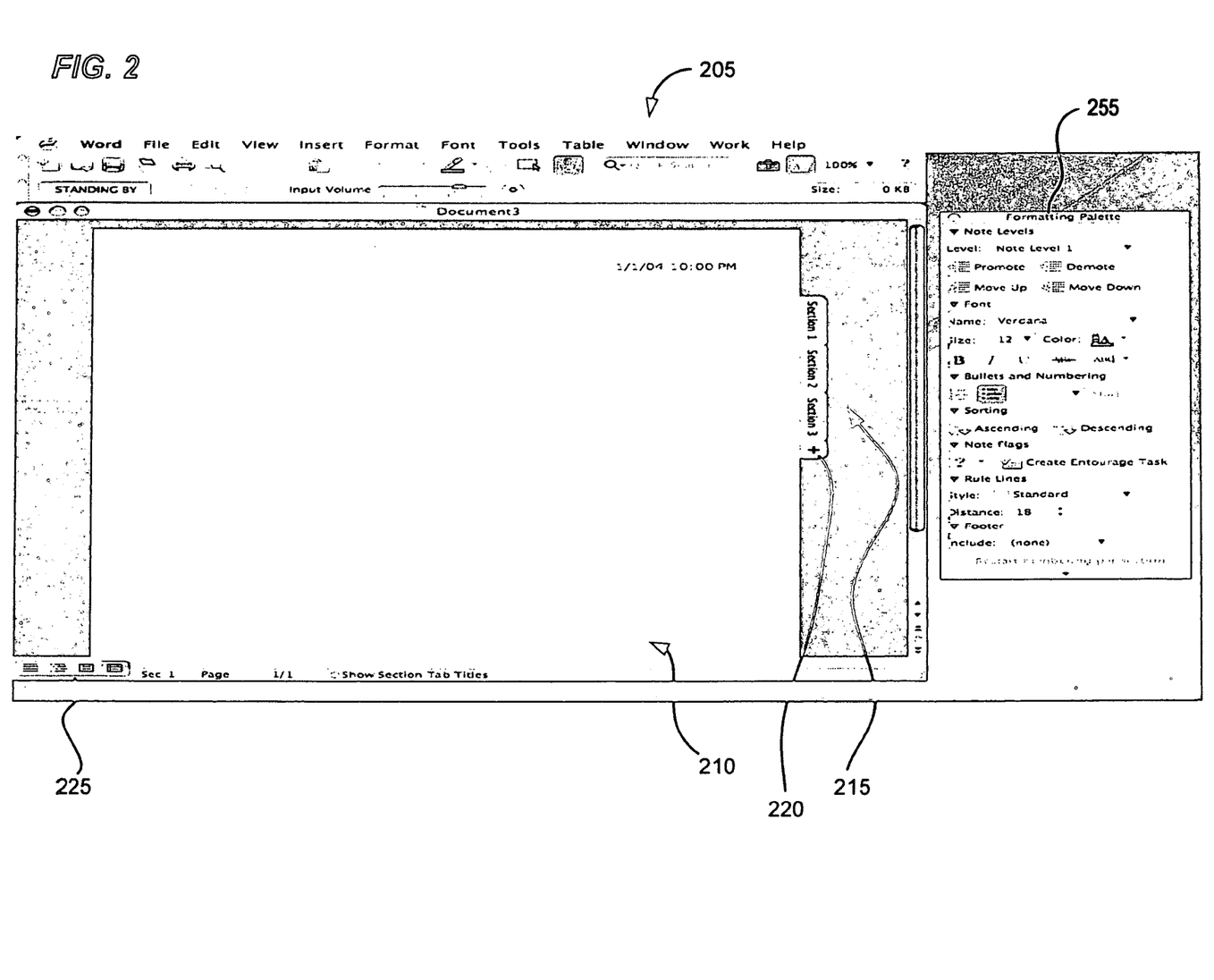
FIG. 2 shows a view of a graphical user interface that operates in accordance with various aspects of the invention.

FIG. 2 shows a view of a graphical user interface that operates in accordance with various aspects of the invention.

The user interface 205 shows a snapshot of a word processor that includes a notebook layout view 210 for taking notes. The user interface 205 may have a reduced set of icons and menu items when in the notebook layout view 210. In one embodiment of the invention, when in the notebook layout view 210, just those icons and menu items applicable to note-taking are exposed.

The notebook layout view 210 may be created by applying note-taking properties to a standard word processing document. Such properties may include a document grid, note styles, section tabs, a default note header, and a special tag (or variable) that indicates that the document has been instantiated in a notebook layout view.

The document grid allows text, pictures, tables, and the like to snap to gridlines that can be adjusted in real time via a formatting palette 255. The note styles define paragraph formatting (e.g., font attributes, custom indentation for each level, style for following paragraph, and the like), which ensure that certain aspects (e.g., the note taking format) of the notebook layout view document retain their appearance when switching to different views. Following is a table that includes exemplary note styles:

Note styles may be associated with a list that associates a style with each level of indention in the document. The list may define which style should be applied to a block of text when the user hits a tab or back tab key, even when the document is edited in a view other than notebook layout view. The note header provides a location for a tab section title (e.g., similar to the title for a section of a paper-based notebook) and a creation date and time.

The notebook layout view 210 may include tabs 215 that, when selected, show different sections of the notebook layout view 210. A plus tab 220 provides a visual mechanism for adding additional sections to the notebook layout view 210. Selecting the plus tab 220 causes the graphical user interface to present a new section tab that may then be selected to access a new section of the notebook layout view 210.

The graphical user interface may display a formatting palette 255 that includes various shortcuts for formatting information in the notebook layout view 210. Such formatting may include, among other things, promoting or demoting outlined material, moving outline sections up or down, changing fonts, colors, and/or other text features (e.g.,

Note Style Levels

| Level Name | Description |
| --- | --- |
| Note Level 1 | Description: Normal + Font: Verdana, Keep with next, Level 1, Tabs: 0", List tab, Outline numbered + Level: 1 + Numbering Style: Bullet + Aligned at: 0" + Tab after: 0" + Indent at 0" <br> Based on: Normal <br> Style for following paragraph: Note Level 1 |
| Note Level 2 | Description: Normal + Font: Verdana, Indent: Left 0.5", Hanging: 0.25", Keep with next, Level 2, Tabs: 0.5", List tab, Outline numbered + Level: 2 + Numbering Style: Bullet + Aligned at: 0.5" + Tab after: 0.5" + Indent at 0.75" <br> Based on: Normal <br> Style for following paragraph: Note Level 2 |
| Note Level 3 | Description: Normal + Font: Verdana, Indent: Left 1", Hanging: 0.25", Keep with next, Level 3, Tabs: 1", List tab, Outline numbered + Level: 3 + Numbering Style: Bullet + Aligned at: 1" + Tab after: 1" + Indent at 1.25" <br> Based on: Normal <br> Style for following paragraph: Note Level 3 |
| Note Level 4 | Description: Normal + Font: Verdana, Indent: Left 1.5", Hanging: 0.25", Keep with next, Level 4, Tabs: 1.5", List tab, Outline numbered + Level: 4 + Numbering Style: Bullet + Aligned at: 1.5" + Tab after: 1.5" + Indent at 1.75" <br> Based on: Normal <br> Style for following paragraph: Note Level 4 |
| Note Level 5 | Description: Normal + Font: Verdana, Indent: Left 2", Hanging: 0.25", Keep with next, Level 5, Tabs: 2", List tab, Outline numbered + Level: 5 + Numbering Style: Bullet + Aligned at: 2" + Tab after: 2" + Indent at 2.25" <br> Based on: Normal <br> Style for following paragraph: Note Level 5 |
| Note Level 6 | Description: Normal + Font: Verdana, Indent: Left 2.5", Hanging: 0.25", Keep with next, Level 6, Tabs: 2.5", List tab, Outline numbered + Level: 6 + Numbering Style: Bullet + Aligned at: 2.5" + Tab after: 2.5" + Indent at 2.75" <br> Based on: Normal <br> Style for following paragraph: Note Level 6 |
| Note Level 7 | Description: Normal + Font: Verdana, Indent: Left 3", Hanging: 0.25", Keep with next, Level 7, Tabs: 3", List tab, Outline numbered + Level: 7 + Numbering Style: Bullet + Aligned at: 3" + Tab after: 3" + Indent at 3.25" <br> Based on: Normal <br> Style for following paragraph: Note Level 7 |
| Note Level 8 | Description: Normal + Font: Verdana, Indent: Left 3.5", Hanging: 0.25", Keep with next, Level 8, Tabs: 3.5", List tab, Outline numbered + Level: 8 + Numbering Style: Bullet + Aligned at: 3.5" + Tab after: 3.5" + Indent at 3.75" <br> Based on: Normal <br> Style for following paragraph: Note Level 8 |
| Note Level 9 | Description: Normal + Font: Verdana, Indent: Left 4", Hanging: 0.25", Keep with next, Level 9, Tabs: 4", List tab, Outline numbered + Level: 9 + Numbering Style: Bullet + Aligned at: 4" + Tab after: 4" + Indent at 4.25" <br> Based on: Normal <br> Style for following paragraph: Note Level 9 | bolding, italics, underlining, and the like), creating tasks based on notebook material (e.g., by sending task information to a task module or task tracking software), adding, removing, or formatting ruler lines in the notebook layout view 210, formatting footers, and the like. Similar to the notebook layout view 205, in one embodiment of the invention, the formatting palette 255 may expose just that functionality related to note-taking when the user interface 205 displays the notebook layout view 210.

Figure 3:
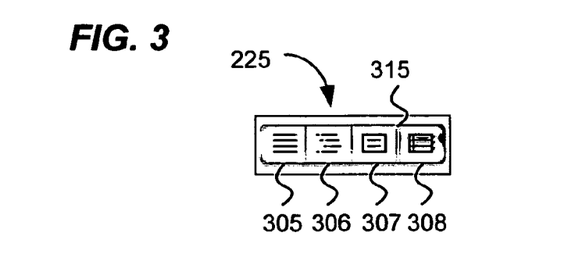
FIG. 3 shows a graphical representation of a view switcher in accordance with various aspects of the invention.

A view switcher 225 provides a group of icons that may be selected to change from one word processing view to another. Some exemplary views include normal, outline, page layout, and notebook layout. A normal view may show the text that has been entered into the word processor but may not show the exact format in which the text will be printed (e.g., the view shown in normal view may be missing page numbers, headers and footers, pictures, and the like), while the page layout view may show the text similar or identical to how it would be printed. The outline view may show a hierarchy of the structure of a document in a standard outlining view while the notebook layout may cause the text to be displayed in a notebook view. The view switcher 225 is described in more detail below in conjunction with FIG. 3.

The note-taking properties described above may be applied either at the creation of a new document or when converting an existing document into a notebook layout document. To avoid an excess of styles and thereby cluttering the style name space, the note styles may be instantiated just when they are needed. For example, instead of having the note styles available at all times, the word processor may instantiate the note styles when a new notebook layout view document is created and typed in or when another document is converted into a notebook layout view document. Instantiating note styles when needed avoids adding new styles that a user must scroll through when creating a document in a non-notebook layout view.

Using note styles may allow easier switching between views. For example, a word processor may be programmed to display content in different views based on styles. When in one view, the word processor may display content associated with a style in one manner while in another view the word processor may display content associated with the style in a similar or different manner. When a document is created in a notebook layout view and then switched to a new view, switching the way the document is displayed in the new view may be accomplished, in part, by using the note styles in the new view. It will be recognized that this method of formatting the notebook layout view provides a method of switching from the notebook layout view to another view that does not require translation.

To provide for backward and cross-platform compatibility, data structures, properties, or elements (hereinafter collectively referred to as "data structures") existing in previous or cross-platform versions of a word processor may be used to store the note-taking data properties. For example, styles, sections, headers, and footers may exist in other versions of a word processor. Using these data structures to signal different portions of a notebook layout document may provide a mechanism for the earlier or cross-platform versions of the word processor to display a document created in a notebook layout view.

A non-notebook layout view of another version or view of a word processor may not have the ability to flag text for follow up. Storage for arbitrary floating picture data such as a checkbox or flag, however, may typically be available in the other version of the word processor. To flag text for follow up such that a visual image appears when not in the notebook layout view, a floating picture data structure may be used in the notebook layout view that shows the appropriate graphic while in other views. The floating picture may be locked so that it may not be resized or changed in other versions or views and may be identified with a unique property such as a name to locate it when switching back to the notebook layout view.

A non-notebook layout view of another version or view of a word processor may not store titles for sections in the section data structure. Furthermore, tabs that have titles in a notebook layout view and that are associated with sections in other views may be rearranged (e.g., sections may be moved around) when in other views. The title for each tab of the notebook layout view needs to be stored somewhere so that the titles may be recovered when switching back to notebook layout view. To do this, document variables may be used. A document variable is a data structure associated with a document into which arbitrary data may be stored. To associate particular document variables with tabs of a notebook layout view, a separate bookmark may be created and attached to each section of a document. Each bookmark may have a programmatically set name. A bookmark's name may be set to the name of a document variable and the name of the tab placed in the document variable. To retrieve the name of a tab when switching to notebook layout view, the name of a bookmark associated with a section may be retrieved and used to access the document variable which contains the name of the tab.

Document variables may also be used to store other properties particular to notebook layout view. For example, a document variable may be used to store whether alternating lines of text shown in the notebook layout view are shown in alternating colors.

Data may also be stored in field codes. A field code stores a reference to data with which the field code is associated. This data is stored as part of the document. In layouts other than notebook layout view, a word processor may ignore the information stored in a field code while still maintaining the information. When switching back to notebook layout view, the information may be retrieved and used in a manner appropriate for the notebook layout view. Thus, field codes may be ideal for inserting information into a document that is unique to the notebook layout view and should be ignored by other views. One such data type that may be located using a field code is data for audio markers.

While earlier or cross-platform versions may not be programmed to display the notebook view layout (e.g., with its tabs, special menus and icons, and the like), they may be able to use the note-taking properties as stored in the data structures to display the content of the document in a different view in a format that is similar or identical to the format in which the notes were originally created. Alternatively, some of the data structures may be displayed in one manner when in notebook layout view and in another manner when in a different layout view. For example, a notebook header may be stored in a header data structure found in a word processor such that when viewed in a non-notebook layout view the notebook header is displayed in a form appropriate for the non-notebook layout view. When the notebook header is displayed in notebook layout view, however, it may be displayed more appropriately to note taking (e.g., with enlarged fonts for the title of the tab, creation date, author, and the like).

Furthermore, some behaviors of a standard word processor may be changed while in notebook layout view. For example, pressing tab while in the header of a document in normal view may insert a tab in the header. Doing the same thing in notebook layout view while in the note header may cause the note header to be exited to begin note taking. This may be done to meet user expectations of a particular view.

As another example, a printed document may or may not have ruler lines depending on user selection or preference.

It should be noted, however, that even though the behavior may change while in the notebook layout view, compatibility with other versions is ensured by storing data in the appropriate data structures in a manner that is compatible with the other views.

In one embodiment of the invention, a notebook layout document has the following data structures: note tabs, note headers, creation date, author, and rule lines. Mapping the data structures to data structures found in other views of a word processor or to a word processor that does not support a notebook layout view may be done as follows: note tabs may be stored as sections; note headers may be stored in page headers; a creation date may be stored in the creation date of a document; an author may be stored in an author data structure of the document; and rule lines properties may be stored in a grid data structure of a document.

Using data structures from a word processing data format that is widely-available and that is used by word processors from different vendors to signal different portions of a notebook layout view may also assist in allowing word processors from different vendors to view data that was created in the notebook layout view while preserving the note-taking data properties.

As described previously, one method of changing views may be through the use of the view switcher 225. The view switcher 225 is shown by itself in FIG. 3 in accordance with various aspects of the invention. The view switcher 225 includes four icons 305-308. It will be understood, however, that more or fewer icons may be included in the view switcher 225 without departing from the spirit or scope of the invention. Each icon may be associated with a particular view. For example, selecting the icon 305 may cause the word processor to display a normal view; selecting the icon 306 may cause the word processor to display an outline view; selecting the icon 307 may cause the word processor to display content in a print layout view; and selecting the icon 308 may cause the word processor to display content in a notebook layout view. An icon (e.g., icon 308) may have a special separator (e.g., a double line 315) or other indication that separates it from other icons. This separator may provide a visual indication to indicate that changing an existing document to the view associated with the icon may cause a lossy document conversion to take place.

Figure 4:
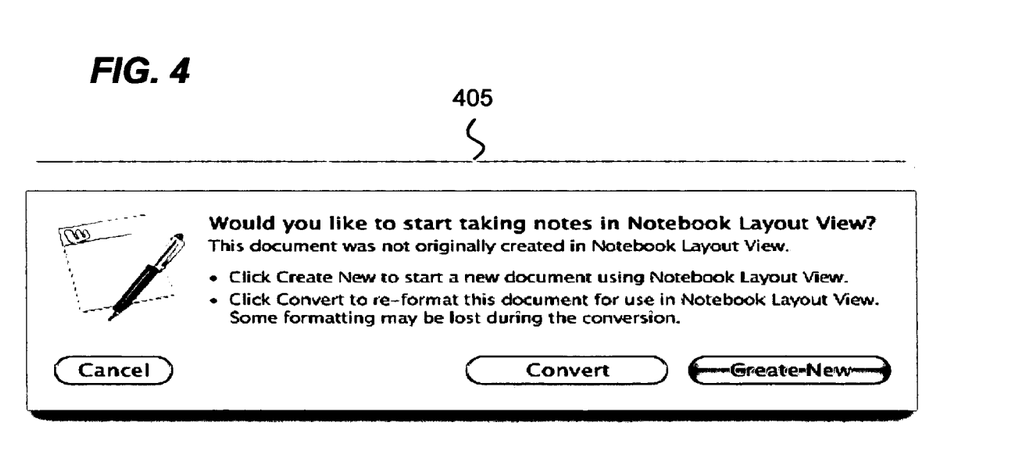
FIG. 4 shows a view of an exemplary dialog box that may be shown when a user attempts to change to a notebook layout view in accordance with various aspects of the invention.

Along these lines, FIG. 4 shows a view of an exemplary dialog box that may be shown when a user attempts to change to a notebook layout view in accordance with various aspects of the invention. The dialog box 405 may be displayed when the document the user is currently creating or editing is not currently formatted in accordance with the note-taking properties previously mentioned. Documents that are already formatted with the note-taking properties may typically be shown in any document view without requiring a conversion as previously discussed.

Many document types that are not formatted with the note-taking properties previously mentioned do not lend themselves to being displayed in a notebook layout view. For example, academic papers, resumes, financial reports, newsletters, and the like may not display well in a notebook layout view. Rather than apply note-taking properties to such documents automatically, the dialog box 405 may be displayed. The dialog box 405 indicates that the document was not originally created in a notebook layout view and that converting the document to notebook layout view may cause some formatting to be lost. The user may then be presented with buttons that allow the user to convert the document, to cancel changing to the notebook layout view, or to create a new document in the notebook layout view.

In one embodiment of the invention, users may not be allowed to change to a notebook layout view from another view. This may be done to avoid confusing or frustrating the user.

In one embodiment of the invention, if the user selects the convert button, a certain note style (e.g., note level 1) may be applied to each paragraph in the document. In other embodiments different note styles may be applied to different paragraphs in the document according to some selected or predetermined mapping. In yet other embodiments, note styles are applied to each paragraph of the document depending on how far indented each paragraph is. In yet other embodiments, no note styles may be applied to any existing paragraph in the document, but note levels may be applied to any new material added to the document while in notebook layout view.

During conversion three or more sections and tabs, default note headers, and a special variable may be added. The special variable may indicate that the document has been formatted in accordance with a notebook layout view so that subsequent switches between views no longer require conversion. Formatting a document in accordance with a notebook layout view is sometimes referred to as instantiating a notebook layout view.

Figure 5:
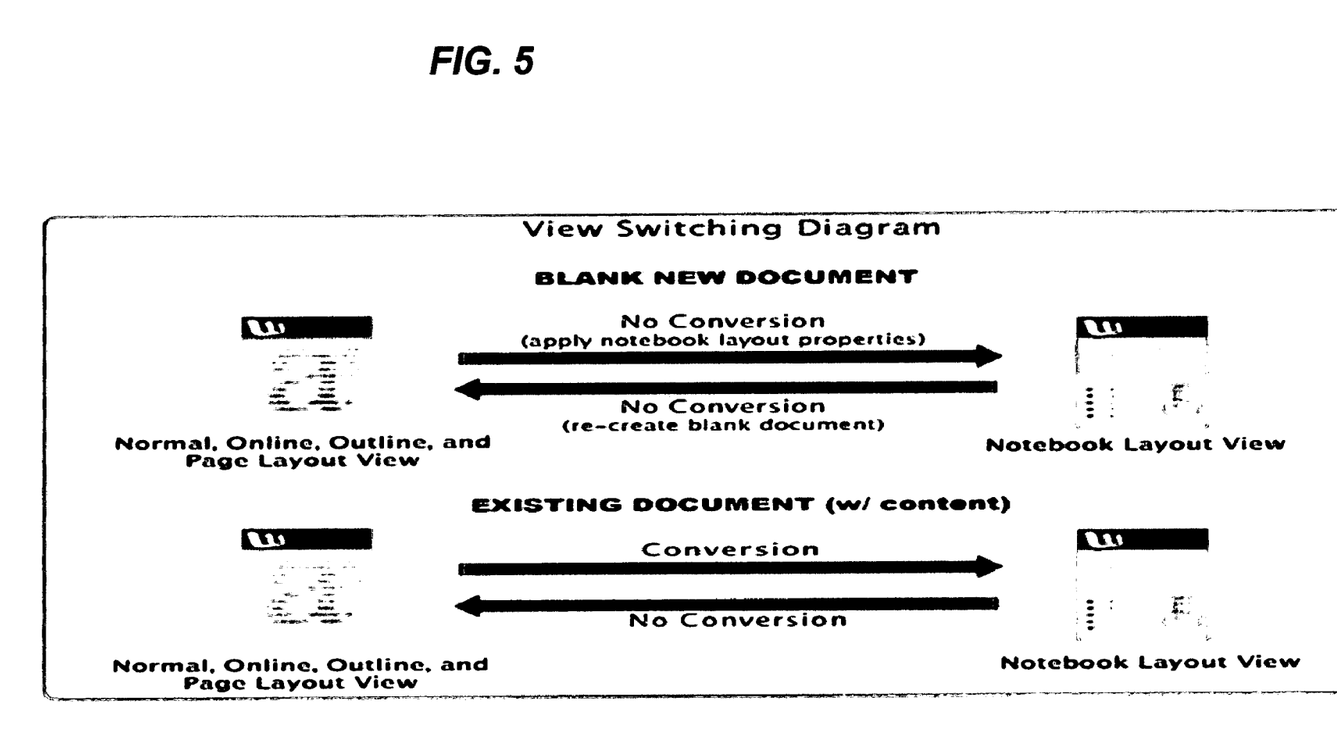
FIG. 5 shows a view switching diagram that indicates what may happen as a user switches to and from notebook layout view.

FIG. 5 shows a view switching diagram that indicates what may happen as a user switches to and from notebook layout view, in accordance with various aspects of the invention. If switching to and from the notebook layout view is performed on a blank document, there is no conversion. If the document includes content, however, then conversion may occur. If the view is changed for a document that was originally created in notebook layout view and includes content, no conversion is necessary to change to or from the notebook layout view. If the view is changed to a notebook layout view from a document that was originally created in another view and that document includes content, conversion may be necessary to change to the notebook layout view if a conversion has not occurred previously. After the conversion occurs, however, any subsequent switches to the notebook layout view for that document may no longer require conversion.

Figure 6:
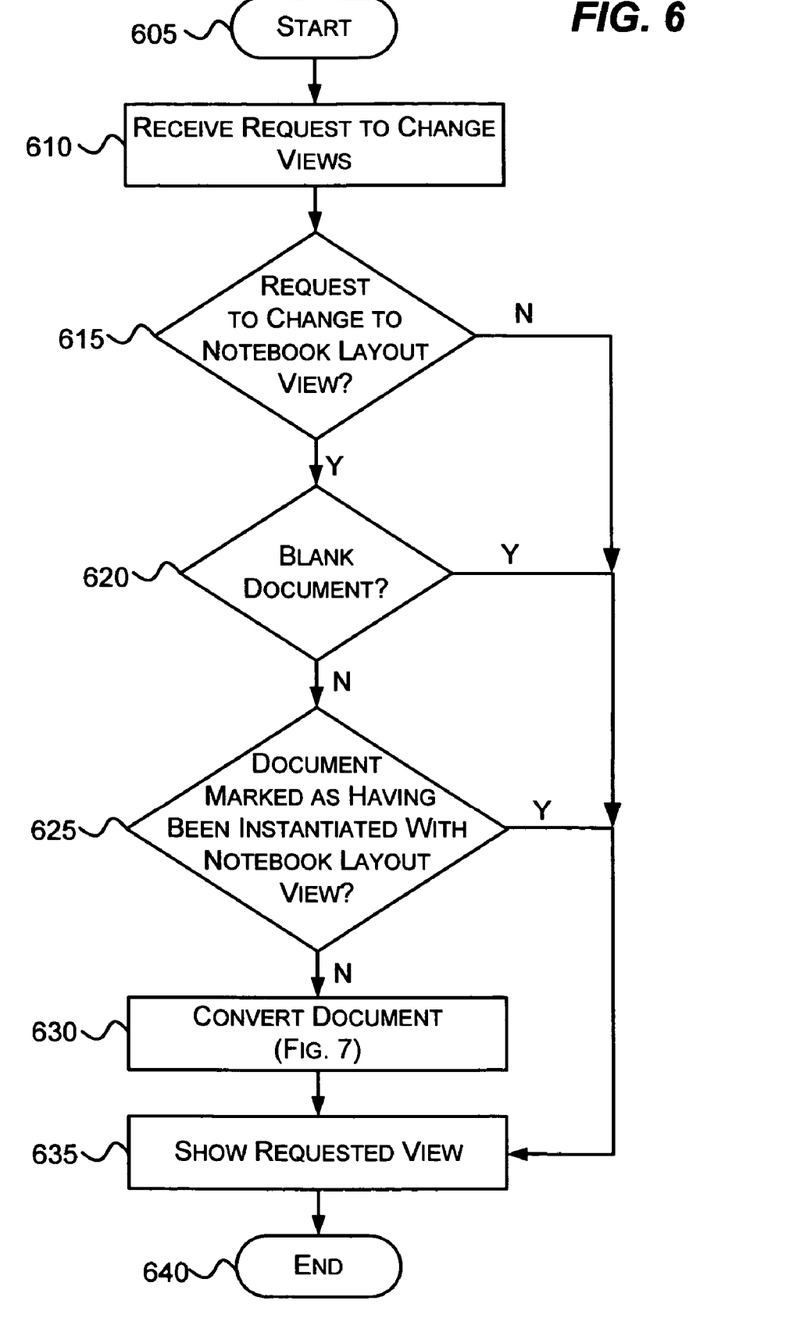
FIGS. 6 and 7 are flow diagrams that generally represent exemplary steps that may occur in changing views in accordance with various aspects of the invention.
Figure 7:
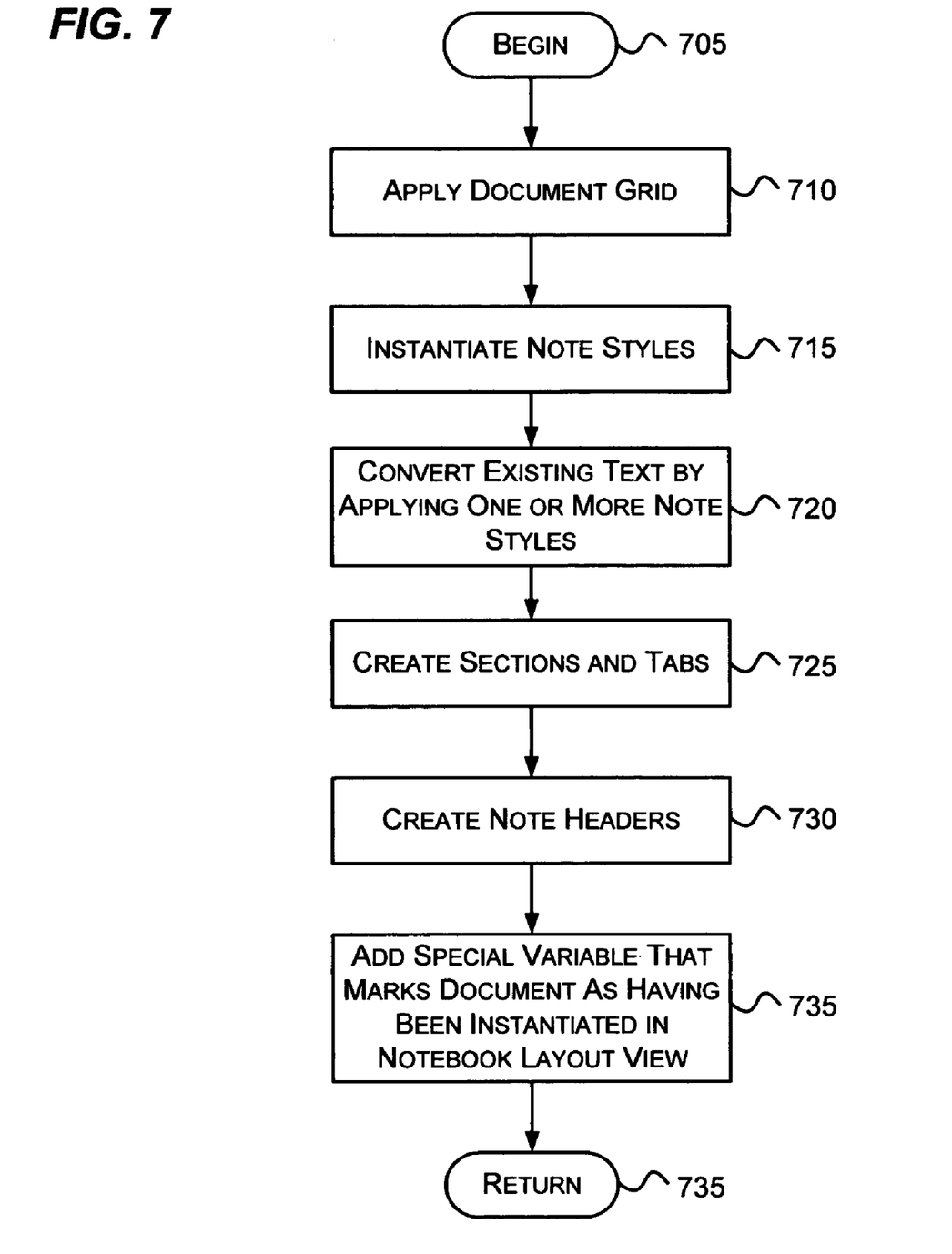

FIGS. 6 and 7 are flow diagrams that generally represent exemplary steps that may occur in changing views in accordance with various aspect of the invention. The process begins at block 605. At block 610 a request to change views is received. At block 615, a determination is made as to whether the request is to change to a notebook layout view. If so, processing continues at block 620; otherwise processing continues at block 635. At block 620 a determination is made as to whether the document includes any content. If so, processing continues at block 635; otherwise, processing continues at block 625.

At block 625, a determination is made as to whether the document is marked as having been instantiated with a notebook layout view. If so, processing continues at block 635; otherwise, processing continues at block 630. The document may be marked as having been instantiated with a notebook layout view if it was created in or previously converted to the notebook layout view.

Before converting the document at block 630 the user may be queried as to whether the user really wants to convert the document. A dialog box such as the dialog box 405 of FIG. 4 may be displayed to receive the user's input. If the user selects that the user does not want to convert the document, processing may stop and the requested view may not be shown.

At block 630, the document is converted as described in more detail in conjunction with FIG. 7. At block 635, the requested view is shown. At block 640, processing ends. The process described above may be repeated each time a request to change views is received.

Turning to FIG. 7, the process begins at block 705. At block 710, a document grid is applied to the document to be converted. At block 715, note styles are instantiated. At block 720, existing text is converted by applying one or more note styles. At block 725, sections are created that correspond to the tabs shown in FIG. 2. In one embodiment of the invention, three sections are created. At block 730, note headers are created. At block 735, a special variable is added to the document that indicates that the document has been instantiated in the notebook layout view. At block 735, the process returns.

As can be seen from the foregoing detailed description, there is provided an improved method and system for seamlessly integrating word processing functionality with note taking. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable medium having computer-executable instructions, comprising:
   creating a document in a word processor having at least two views for viewing the document including a notebook layout view designed for note taking and a non-notebook layout view;
   instantiating a style pertinent to the notebook layout view;
   switching from the notebook layout view to the non-notebook layout view, wherein data obtained while in the notebook layout view is maintained in data structures that are available in the non-notebook layout view, and wherein the note styles are associated with a list that associates each note style with a level of indention in the document, the list defining which note style is applied to a block of text when a tab or back tab key is pressed; and
   displaying data in the non-notebook layout view formatted according to the style.

2. A computer-readable medium having computer-executable instructions, comprising:
   creating a document in a word processor having at least two views for viewing the document including a notebook layout view designed for note taking and a non-notebook layout view;
   instantiating a style pertinent to the notebook layout view;
   switching from the notebook layout view to the non-notebook layout view, wherein data obtained while in the notebook layout view is maintained in data structures that are available in the non-notebook layout view;
   displaying data in the non-notebook layout view formatted according to the style; and
   displaying a view switcher that includes icons, each icon causing the first word processor to switch to a view associated with the icon, one of the icons having a visual indication to indicate that switching to the view associated with the icon may cause a lossy document conversion to occur.

3. A computer-readable medium having computer-executable instructions, comprising:
   creating a document in a word processor having at least two views for viewing the document including a notebook layout view designed for note taking and a non-notebook layout view;
   instantiating a style pertinent to the notebook layout view;
   switching from the notebook layout view to the non-notebook layout view, wherein data obtained while in the notebook layout view is maintained in data structures that are available in the non-notebook layout view;
   displaying data in the non-notebook layout view formatted according to the style; and
   marking a block of text in the notebook layout view to associate the text with a task and storing the information associated therewith in a floating picture object that displays a graphic that indicates that the text is associated with the task, wherein the graphic is displayed in the non-notebook layout view.

4. The computer-readable medium as defined in any of claims 1, 2 or 3, wherein the style is instantiated when the document is converted for viewing in the notebook layout view.

5. The computer-readable medium as defined in any of claims 1, 2 or 3, wherein the style is instantiated when text is first entered into the document while viewing the document in the notebook layout view.

6. The computer-readable medium as defined in any of claims 1, 2 or 3, wherein the style is instantiated for formatting text in the document while viewing the document in the notebook layout view and wherein the word processor includes other styles that exist for formatting text in the document while viewing the document in the non-notebook layout view.

7. The computer-readable medium as defined in any of claims 1, 2 or 3, further comprising removing icons and menu items applicable only to the non-notebook layout view when viewing the document in the notebook layout view.

8. The computer-readable medium as defined in any of claims 1, 2 or 3, wherein the notebook layout view shows tabs that are each associated with a section in the non-notebook layout view.

9. The computer-readable medium of claim 8, wherein selecting a tab while viewing the document in the notebook layout view causes the section associated with that tab to be displayed.

10. The computer-readable medium of claim 8, wherein the word processor does not display tabs that are each associated with a section while viewing the document in the non-notebook layout view.

11. A method, comprising:
    selecting a notebook layout view in a first word processor, the first word processor having at least two views for viewing a document including the notebook layout view;
    instantiating note styles that include formatting applied to text entered in the first word processor, wherein the note styles are stored in one or more data structures usable to format text in a non-notebook layout view, and wherein the note styles are associated with a list that associates each note style with a level of indention in the document, the list defining which note style is applied to a block of text when a tab or back tab key is pressed; and displaying tabs in the notebook layout view, each tab when selected causing a different section of the document to be displayed.

12. A method, comprising:

selecting a notebook layout view in a first word processor, the first word processor having at least two views for viewing a document including the notebook layout view;

instantiating note styles that include formatting applied to text entered in the first word processor, wherein the note styles are stored in one or more data structures usable to format text in a non-notebook layout view;

displaying tabs in the notebook layout view, each tab when selected causing a different section of the document to be displayed; and displaying a view switcher that includes icons, each icon causing the first word processor to switch to a view associated with the icon, one of the icons having a visual indication to indicate that switching to the view associated with the icon may cause a lossy document conversion to occur.

13. A method, comprising:

selecting a notebook layout view in a first word processor, the first word processor having at least two views for viewing a document including the notebook layout view;

instantiating note styles that include formatting applied to text entered in the first word processor, wherein the note styles are stored in one or more data structures usable to format text in a non-notebook layout view;

displaying tabs in the notebook layout view, each tab when selected causing a different section of the document to be displayed; and marking a block of text in the notebook layout view to associate the text with a task and storing the information associated therewith in a floating picture object that displays a graphic that indicates that the text is associated with the task, wherein the graphic is displayed in the non-notebook layout view.

14. The method as defined in any of claims 11, 12 or 13 wherein the note styles need no conversion of the one or more data structures to other data structures to format the text in the non-notebook layout view.

15. The method as defined in any of claims 11, 12 or 13, further comprising creating a variable that indicates that the document has been instantiated in the notebook layout view.

16. The method as defined in any of claims 11, 12 or 13, further comprising applying a document grid to content entered into the document while the document is viewed in the notebook layout view, the document grid causing visual elements of the content to be snapped thereto.

17. The method of claim 16, wherein the visual elements include text, pictures, and tables.

18. The method of claim 16, wherein the document grid is adjusted in real time via a formatting palette.

19. The method as defined in any of claims 11, 12 or 13, wherein the note styles define paragraph formatting that ensure that formatted text entered into the notebook layout view document retains its appearance when switching to a non-notebook layout view.

20. The method as defined in any of claims 11, 12 or 13, further comprising displaying a plus tab that is operable to add a new tab to the notebook layout view when selected.

21. The method as defined in any of claims 11, 12 or 13, further comprising displaying the document in a second word processor that does not include a notebook layout view, the document needing no data structure conversion to display in the second word processor.

22. The method of claim 21, wherein the second word processor is a previous version of the first word processor.

23. The method of claim 21, further comprising:

editing the document and adding new text in the second word processor reloading the document in the first word processor;

retrieving data from data structures maintained in the document;

displaying the document with the new text in the notebook layout view of the first word processor.

24. The method as defined in any of claims 11 or 12, further comprising marking a block of text in the notebook layout view to associate the text with a task and storing the information associated therewith in a floating picture object that displays a graphic that indicates that the text is associated with the task, wherein the graphic is displayed in the non-notebook layout view.

25. The method as defined in any of claims 11 or 13, further comprising displaying a view switcher that includes icons, each icon causing the first word processor to switch to a view associated with the icon, one of the icons having a visual indication to indicate that switching to the view associated with the icon may cause a lossy document conversion to occur.

26. The method as defined in any of claims 12 or 13, wherein the note styles define paragraph formatting that ensures that formatted text entered into the notebook layout view document retains its appearance when switching to a non-notebook layout view.

27. The method of claim 16, wherein the list defines which note style is applied even when the document is viewed in a non-notebook layout view.

* * * * *